United States Patent
Nawaz

(10) Patent No.: US 11,221,393 B2
(45) Date of Patent: Jan. 11, 2022

(54) METHOD AND PROCESSOR FOR DETERMINING SPATIAL INFORMATION REGARDING A VEHICLE

(71) Applicant: NXP USA, Inc., Austin, TX (US)

(72) Inventor: Muhammad Saad Nawaz, Munich (DE)

(73) Assignee: NXP USA, Inc., Austin, TX (US)

( * ) Notice: Subject to any disclaimer, the term of this patent is extended or adjusted under 35 U.S.C. 154(b) by 164 days.

(21) Appl. No.: 16/706,112

(22) Filed: Dec. 6, 2019

(65) Prior Publication Data
US 2020/0225338 A1 Jul. 16, 2020

(30) Foreign Application Priority Data
Jan. 16, 2019 (EP) .................................. 19152106

(51) Int. Cl.
*G01S 7/02* (2006.01)
*B60W 30/16* (2020.01)
(Continued)

(52) U.S. Cl.
CPC ............. *G01S 7/023* (2013.01); *B60W 30/16* (2013.01); *G01S 7/354* (2013.01); *G01S 7/414* (2013.01);
(Continued)

(58) Field of Classification Search
None
See application file for complete search history.

(56) References Cited

U.S. PATENT DOCUMENTS 4,042,924 A 8/1977 Evans et al.
4,482,970 A * 11/1984 Barry .................. G01S 13/72
702/190
(Continued)

FOREIGN PATENT DOCUMENTS

CN 103197290 B 7/2013
EP 0704713 B1 11/2000
(Continued)

OTHER PUBLICATIONS

A. W. Doerry et al., "Compound Radar Waveforms with Multiple Frames"; proceedings of the International Society of Optics and Photonics 2013 Defense, Security & Sensing Symposium; vol. 8714, pp. 1-14; publication SAND2013-1451C; held in Baltimore, Maryland, USC in the year 2013. (Year: 2013).*
(Continued)

*Primary Examiner* — Bernarr E Gregory

(57) ABSTRACT

A method and processor to determine spatial information regarding a vehicle. The method includes receiving at least one initial frame of FMCW radar data including spatial information regarding the vehicle associated with a radar signal reflected back from the vehicle via a surface of at least one stationary object other than the vehicle. The method also includes receiving at least one further frame of FMCW radar data including: spatial information regarding the vehicle associated with a radar signal reflected back from the vehicle via the surface of at least one stationary object other than the vehicle, and spatial information regarding the vehicle associated with a radar signal reflected directly back from the vehicle. The method further includes using the at least one initial frame of radar data to correct for static clutter associated with the at least one stationary object in the at least one further frame of radar data.

14 Claims, 3 Drawing Sheets

(51) Int. Cl.
    *G01S 7/35*     (2006.01)
    *G01S 7/41*     (2006.01)
    *G01S 13/44*     (2006.01)
    *G01S 13/526*     (2006.01)
    *G06K 9/00*     (2006.01)
    *G01S 13/00*     (2006.01)

(52) U.S. Cl.
    CPC ...... *G01S 13/4418* (2013.01); *G01S 13/5265* (2013.01); *G06K 9/00805* (2013.01)

(56) References Cited

U.S. PATENT DOCUMENTS

| | | | | |
|---|---|---|---|---|
| 6,438,491 | B1 * | 8/2002 | Farmer | G01S 13/931 |
| | | | | 701/301 |
| 10,365,650 | B2 * | 7/2019 | Rust | G05D 1/0272 |
| 10,691,135 | B2 * | 6/2020 | Campbell | G01S 13/931 |
| 10,890,919 | B2 * | 1/2021 | Smith | G01S 13/931 |
| 2017/0031003 | A1 | 2/2017 | Dougherty et al. | |
| 2017/0212231 | A1 | 7/2017 | Iwai et al. | |
| 2018/0120842 | A1 | 5/2018 | Smith et al. | |

FOREIGN PATENT DOCUMENTS

| | | | |
|---|---|---|---|
| EP | 1672379 | A2 | 6/2006 |
| EP | 1672379 | A3 | 10/2009 |

OTHER PUBLICATIONS

Zhang et al., "Gradient Vector Flow Snake for Airborne Pulsed Doppler Radar Clutter Tracking," IEEE 0-780309584-0/06, 2006, 5 pages.

Zhao et al., "Reduced Complexity Multipath Clutter Rejection Approach for DRM-Based HF Passive Bistatic Radar," IEEE Access, vol. 5, Sep. 26, 2017, 7 pages.

* cited by examiner

METHOD AND PROCESSOR FOR DETERMINING SPATIAL INFORMATION REGARDING A VEHICLE

BACKGROUND

The present specification relates to a method of determining spatial information regarding a vehicle. The present specification also relates to a processor configured to determine spatial information regarding a vehicle. The present specification further relates to an electronic control unit (ECU) for a vehicle, the electronic control unit including such a processor. The present specification also relates to a vehicle including such a processor or electronic control unit.

Traditional surface/multipath rejection algorithms bank on the radar cross-section difference between a direct path-wave and a reflected path-wave. This approach has yielded significant results in radar systems used in aerospace applications, where there is minimal surface clutter within the field-of-view. However this approach is not convincing in automotive radar systems, because the radar cross-section of the reflected path-wave is similar to that of the direct path-wave. This is because of the large amount of concrete and metal-based clutter around a vehicle in the form of features such as the road, buildings, road-dividers and guardrails.

SUMMARY

Aspects of the present disclosure are set out in the accompanying independent and dependent claims.

According to an aspect of the present disclosure, there is provided a method of determining spatial information regarding a vehicle, the method comprising:

receiving at least one initial frame of frequency modulated continuous wave (FMCW) radar data, wherein the at least one initial frame includes spatial information regarding said vehicle associated with a radar signal reflected back from said vehicle via a surface of at least one stationary object other than said vehicle;

receiving at least one further frame of frequency modulated continuous wave (FMCW) radar data, wherein the at least one further frame includes:
  spatial information regarding said vehicle associated with a radar signal reflected back from said vehicle via the surface of at least one stationary object other than said vehicle, and
  spatial information regarding said vehicle associated with a radar signal reflected directly back from the vehicle; and
using the at least one initial frame of radar data to correct for static clutter associated with the at least one stationary object in the at least one further frame of radar data.

According to another aspect of the present disclosure, there is provided a processor configured to determine spatial information regarding a vehicle by:

receiving at least one initial frame of frequency modulated continuous wave (FMCW) radar data, wherein the at least one initial frame includes spatial information regarding said vehicle associated with a radar signal reflected back from said vehicle via a surface of at least one stationary object other than said vehicle;

receiving at least one further frame of frequency modulated continuous wave (FMCW) radar data, wherein the at least one further frame includes:
  spatial information regarding said vehicle associated with a radar signal reflected back from said vehicle via the surface of at least one stationary object other than said vehicle, and
  spatial information regarding said vehicle associated with a radar signal reflected directly back from the vehicle; and
using the at least one initial frame of radar data to correct for static clutter associated with the at least one stationary object in the at least one further frame of radar data.

By tracking the presence of radar signal components reflected back from a vehicle via the surface of at least one stationary object other than the vehicle, these parts of the received radar signal may be rejected, allowing the radar signal to be de-cluttered. This can lead to more efficient tracking of spatial information associated with a radar signal reflected directly back from the vehicle.

Correcting for static clutter may include rejecting radar signal components associated with the radar signal reflected back from the vehicle via the surface of at least one stationary object other than the vehicle. Rejecting the radar signal components associated with the radar signal reflected back from the vehicle via the surface of at least one stationary object other than the vehicle may include determining an angle of arrival of the radar signal components. By way of example only, a signal reflected back from the vehicle via the surface of a road or median strip will tend to arrive at a certain angle. This information may be used to identify and reject this reflected signal.

Correcting for static clutter may include subtracting at least one weighted component of radar data associated with the at least one initial frame from radar data associated with the at least one further frame.

The at least one stationary object may be at least one of a road, a building, a guard rail and a median strip barrier or central reservation barrier.

The method may be performed by a processor of a first vehicle for determining spatial information regarding a second vehicle. The method may further include adjusting a velocity of the first vehicle in response to the spatial information regarding the second vehicle. Accordingly the method may be incorporated into an adaptive cruise control system or method.

The at least one initial frame may also include spatial information regarding the vehicle associated with a radar signal reflected directly back from the vehicle.

The vehicle may be a car, van or truck.

BRIEF DESCRIPTION OF THE DRAWINGS

Embodiments of this disclosure will be described hereinafter, by way of example only, with reference to the accompanying drawings in which like reference signs relate to like elements and in which.

DETAILED DESCRIPTION

Embodiments of this disclosure are described in the following with reference to the accompanying drawings.

In the present specification, the term "radar" refers to Radio Detection And Ranging (also known as RADAR).

Figure 1:
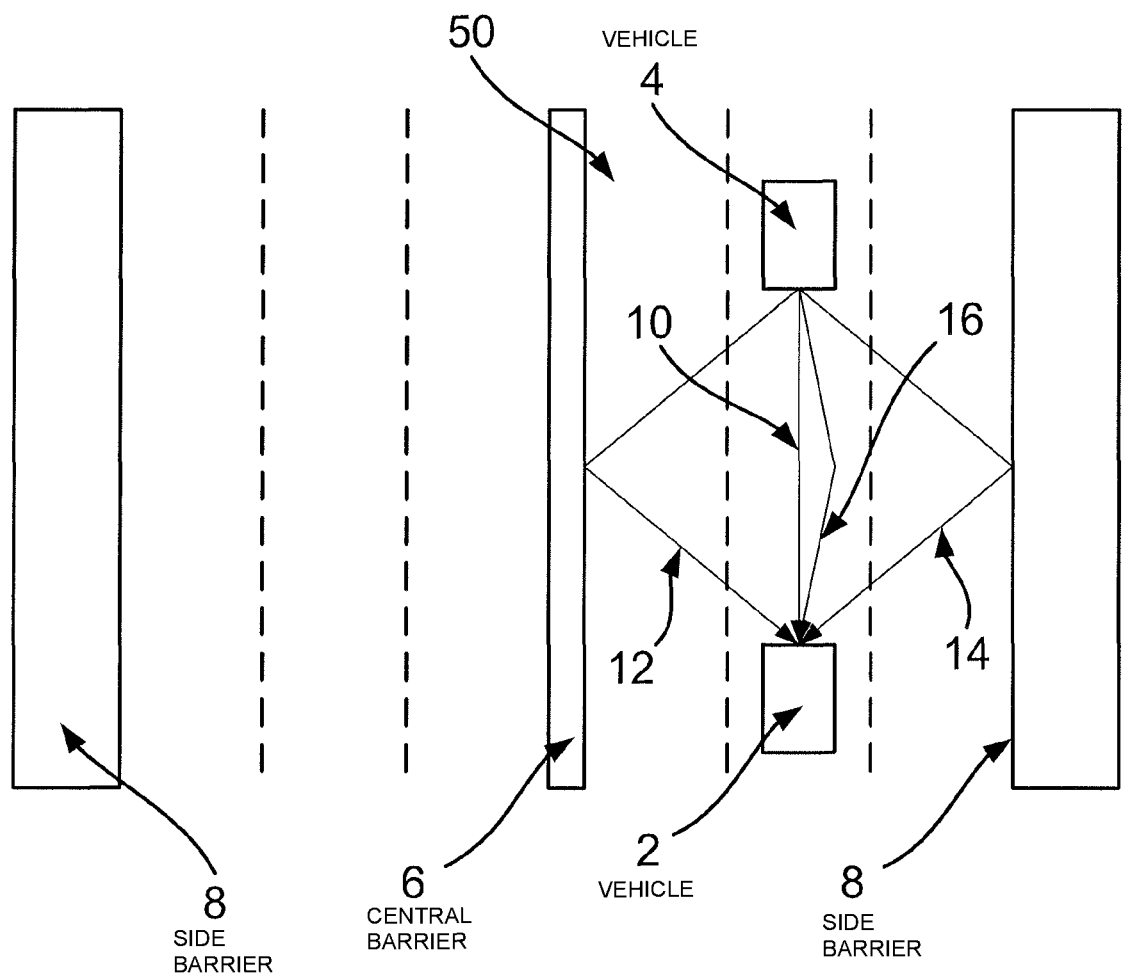
FIG. 1 schematically illustrates the reflection of FMCW radar signals from a vehicle in accordance with an embodiment of this disclosure.

FIG. 1 schematically illustrates the reflection of Frequency Modulated Continuous Wave (FMCW) radar signals from a vehicle in accordance with an embodiment of this disclosure. In particular, FIG. 1 shows a first vehicle 2 and a second vehicle 4. Each vehicle 2, 4 may be, for instance a car, van or truck. The first vehicle 2 is travelling behind the second vehicle 4 on a road 50. In the present embodiment, the road 50 is a freeway or motor way having six lanes including three lanes travelling in a first direction separated from three lanes travelling in a second (opposite) direction by a central barrier 6. The central barrier 6 may be located in a central reservation of median strip of the road 50. Items such as a side barrier 8, street furniture and/or buildings may be located at the sides of the road 50.

In the present embodiment, the first vehicle 2 includes a radar system that is operable to transmit a radar signal and process the reflected signal to obtain spatial and velocity information about objects in the vicinity of the vehicle 2. Data (e.g. FMCW frame data) relating to the reflected signal may analysed by a processor provided in the vehicle 2. The processor may be part of, for instance, an electronic control unit (ECU) and/or adaptive cruise control system of the vehicle 2.

In the embodiment shown in FIG. 1, the reflected signal includes a number of different components.

A first component 10 corresponds to a part of the reflected radar signal that is reflected directly back at the radar receiver of the vehicle 2 by the vehicle 4. That is to say, the component 10 travels directly between the vehicle 4 and vehicle 2 with reflecting from any other surfaces.

Other components of the radar signal reflected radar signal may comprise parts of the radar signal that are reflected back to the vehicle 2 by the vehicle 4, but which are reflected from one or more surfaces of one or more stationary objects en route. A first example of such a reflected component of the radar signal comprises a component 12 of the signal that is reflected from the vehicle 4, but which then is further reflected from the central barrier 6 before reaching the vehicle 2. Another example of such a reflected component of the radar signal comprises a component 14 of the signal that is reflected from the vehicle 4, but which then is further reflected from the side barrier 8 (or other features at the road side such as street furniture or buildings) before reaching the vehicle 2. A further example of such a reflected component of the radar signal comprises a component 16 of the signal that is reflected from the vehicle 4, but which then is further reflected from the surface of the road 50 before reaching the vehicle 2.

Embodiments of this disclosure can allow spatial information regarding the vehicle 4 to be determined in a manner that rejects components of the reflected radar signal such as the components 12, 14, 16 described above, which involve reflections back to the vehicle 2 via the surfaces of one or more stationary objects. This can allow the radar data to be decluttered, leaving primarily the data relating to the directly reflected signal component 10. In turn this can lead to more efficient and accurate tracking of spatial information associated with a radar signal reflected directly back from the vehicle 4. This can improve the operation of, for example, an adaptive cruise control system and/or collision avoidance system using the method and processor disclosed herein.

Figure 2:
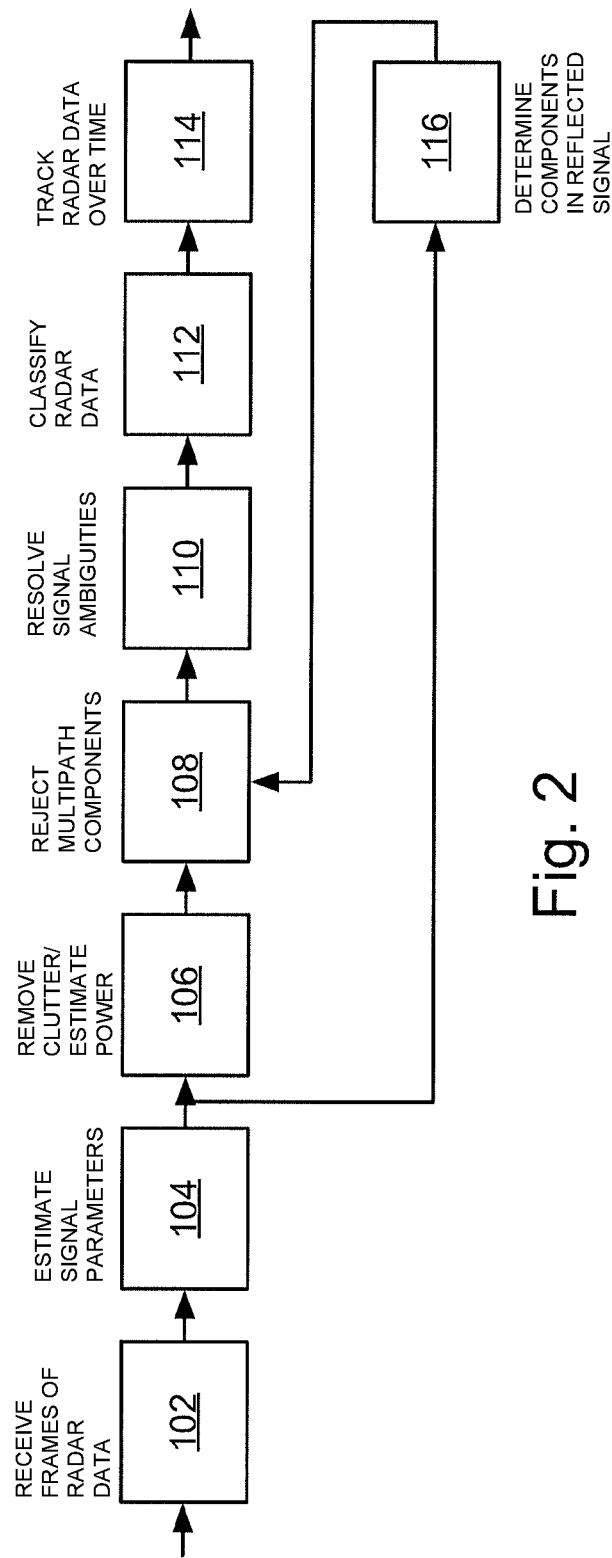
FIG. 2 schematically illustrates a plurality of stages for determining spatial information regarding a vehicle in accordance with an embodiment of this disclosure.

FIG. 2 schematically illustrates a plurality of stages for determining spatial information regarding a vehicle in accordance with an embodiment of this disclosure.

In a first stage 102, one or more frames of FMCW radar data are received for pre-processing. The pre-processing may involve performing a fast Fourier transform (FFT) on the radar data. This may include computing a FFT of the range information included in the FMCW data. This may also include computing a FFT of the Doppler information included in the FMCW data. This may further include computing a FFT of the angle information included in the FMCW data.

The pre-processed data may then be passed on to a next stage 104, in which a direction of arrival (DoA) algorithm such as the Multiple Signal Classification (MUSIC) or Estimation of Signal Parameters via Rotation Invariance Techniques (ESPRIT) may be applied.

At this point, the processing of the radar data may split into two parts.

In a first part, involving stage 116, the radar data may be analysed to determine the presence of components such as the components 12, 14, 16 discussed above, that is to say components that are reflected back from the vehicle 4 via the surfaces of one or more stationary objects. Stage 116 may use the DoA processed data to identify the components of the reflected radar signal that have not been reflected back directly from the vehicle 4.

By way of example, components such as the component 16 shown in FIG. 1, which have been reflected from the surface of the road 50 will tend to arrive at the vehicle 2 from a certain angle. Moreover, these components will tend to be persistent over time. Accordingly, by determining that a part of the overall reflected signal arrives from a direction consistent with reflection from a road surface and by determining that those components persist for a relatively long time (perhaps a few seconds, in the context of a radar system of the kind described herein), those components may be identified as resulting from indirect reflections from the vehicle 4. These components may be rejected in subsequent processing, so as to correct for static clutter associated with at least one stationary object in the vicinity of the vehicle 2.

Similar considerations apply to components such as the components 12, 14 described above in relation to FIG. 1, although it will be appreciated that these components may arrive at the vehicle 2 from different angles to those associated with reflections from the road.

On the other hand, the component 10 in FIG. 1 may tend to arrive over a relatively narrow range of angles associated with direct reflection of the radar signal back from the vehicle 4, without any further intervening reflections.

To summarise, the angle of arrival information determined at stage 104 can be used to identify signal components for rejection owing to their being associated with indirect reflections back from the vehicle. The results of stage 116 may be fed into the multipath rejection stage 108 to be described below.

In a second part, the radar data are processed in a conventional clutter removal/power estimation stage 106. This stage 106 may, for instance use a conventional algorithm such as the Constant false alarm rate (CFAR) algorithm to remove background of noise, clutter and interference associated with, for example, reflections of the radar signal that do not in involve the vehicle 4 at all.

In a next stage, this decluttered data may be processed to remove the components identified in stage 116 as belong to so-called "multipath reflections", i.e. components such as components 12, 14, 16 discussed above. The rejection of these components may allow for faster and more accurate processing of the remaining data for determining spatial information (e.g. position and velocity data) associated with the vehicle 4.

Following the rejection of the multipath components in stage 108, in a next stage 110 certain ambiguities in the radar signal may be resolved. By way of example only, this may (in the velocity domain) involve the resolving of ambiguous velocities associated with harmonics of the actual velocity of the vehicle 4 relative to the vehicle 2.

In a next stage 112, the radar data may be subject to clustering/classification. This may be performed in the spatial domain, for classifying the various parts of the reflected signal in order to classify them (i.e. identify them as objects such as the vehicle 4, or other objects such as trees, pedestrians and so forth).

The resulting data, processed by the stages 102-112 and 116 may be tracked over time in stage 114. This may involve the use of Kalman filter algorithms of the kind known in the art.

Figure 3:
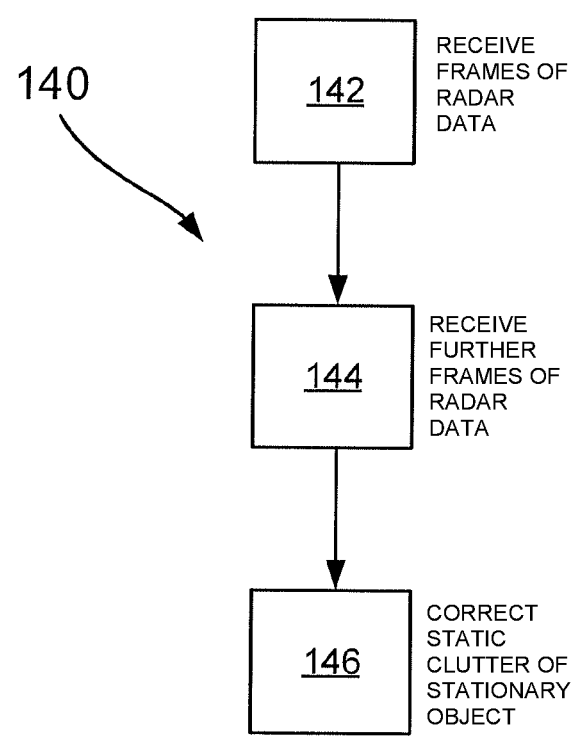
FIG. 3 schematically illustrates a method of determining spatial information regarding a vehicle.

FIG. 3 schematically illustrates a method 140 of determining spatial information regarding a vehicle.

In a first step 142, the method 140 includes receiving at least one initial frame of frequency modulated continuous wave (FMCW) radar data. As described herein, the at least one initial frame includes spatial information (e.g. components 12, 14, 16) regarding the vehicle 4 associated with a radar signal reflected back from the vehicle 4 via a surface of at least one stationary object (e.g. the central barrier 6, side barrier 8, or road 50) other than the vehicle 4. Note that the initial frame(s) may also include spatial information (e.g. component 10) regarding the vehicle 4 associated with a radar signal reflected directly back from the vehicle 4. The purpose of the initial frames is to allow identification (e.g. by angle of arrival) and tracking of the components (e.g. components 12, 14, 16) in the reflected signal that are associated with indirect reflections back from the vehicle 4, so that these components may be used to declutter subsequently received frames as described herein.

In a next step 144, the method 140 includes receiving at least one further frame of frequency modulated continuous wave (FMCW) radar data. The at least one further frame again includes spatial information (e.g. components 12, 14, 16) regarding the vehicle 4 associated with a radar signal reflected back from the vehicle via the surface of at least one stationary object (e.g. the central barrier 6, side barrier 8, or road 50) other than the vehicle 4. The at least one further frame also includes spatial information (e.g. component 10) regarding the vehicle 4 associated with a radar signal reflected directly back from the vehicle 4.

In a next step 146, the method 140 includes using the at least one initial frame of radar data to correct for static clutter associated with the at least one stationary object (e.g. the central barrier 6, side barrier 8, or road 50) in the at least one further frame of radar data. By tracking the presence of radar signal components reflected back from a vehicle 4 via the surface of at least one stationary object (e.g. the central barrier 6, side barrier 8, or road 50) other than the vehicle 4, these parts of the received radar signal may be rejected, allowing the radar signal to be de-cluttered. This can lead to more efficient tracking of spatial information associated with a radar signal reflected directly back from the vehicle 4.

Rejecting of the radar signal components (e.g. components 12, 14, 16) associated with the radar signal reflected back from the vehicle 4 via said surface of at least one stationary object (e.g. the central barrier 6, side barrier 8, or road 50) other than the vehicle 4 may include determining an angle of arrival of said radar signal components. As described above in relation to stage 104, the angle of arrival information determined at stage 104 can be used to identify signal components for rejection owing to their being associated with indirect reflections back from the vehicle. Again, the method may include using a direction of arrival (DoA) algorithm such as the Multiple Signal Classification (MUSIC) or Estimation of Signal Parameters via Rotation Invariance Techniques (ESPRIT).

The method may further include may be performed by a processor of a first vehicle (e.g. vehicle 2) for determining spatial information regarding a second vehicle (e.g. vehicle 4), and may further comprise adjusting a velocity of the first vehicle 2 in response to the spatial information regarding the second vehicle 4. Accordingly, the operation of an adaptive cruise control system and/or collision avoidance system using the method may be improved.

Accordingly, there has been described a method and processor to determine spatial information regarding a vehicle. The method includes receiving at least one initial frame of FMCW radar data including spatial information regarding the vehicle associated with a radar signal reflected back from the vehicle via a surface of at least one stationary object other than the vehicle. The method also includes receiving at least one further frame of FMCW radar data including: spatial information regarding the vehicle associated with a radar signal reflected back from the vehicle via the surface of at least one stationary object other than the vehicle, and spatial information regarding the vehicle associated with a radar signal reflected directly back from the vehicle. The method further includes using the at least one initial frame of radar data to correct for static clutter associated with the at least one stationary object in the at least one further frame of radar data.

Although particular embodiments of this disclosure have been described, it will be appreciated that many modifications/additions and/or substitutions may be made within the scope of the claims.

The invention claimed is:

1. A method of determining spatial information regarding a vehicle, the method comprising:
   receiving at least one initial frame of frequency modulated continuous wave (FMCW) radar data, wherein the at least one initial frame includes spatial information regarding said vehicle associated with a radar signal reflected back from said vehicle via a surface of at least one stationary object other than said vehicle;
   receiving at least one further frame of frequency modulated continuous wave (FMCW) radar data, wherein the at least one further frame includes:
      spatial information regarding said vehicle associated with a radar signal reflected back from said vehicle via the surface of at least one stationary object other than said vehicle, and
      spatial information regarding said vehicle associated with a radar signal reflected directly back from the vehicle; and
   using the at least one initial frame of radar data to correct for static clutter associated with the at least one stationary object in the at least one further frame of radar data.

2. The method of claim 1, wherein said correcting for static clutter comprises rejecting radar signal components associated with the radar signal reflected back from said vehicle via said surface of at least one stationary object other than said vehicle.

3. The method of claim 2, wherein said rejecting radar signal components associated with the radar signal reflected back from said vehicle via said surface of at least one stationary object other than said vehicle comprises determining an angle of arrival of said radar signal components.

4. The method of claim 1, wherein the at least one stationary object includes at least one of a road, a building, a guard rail and a median strip barrier or central reservation barrier.

5. The method of claim 1, wherein the method is performed by a processor of a first vehicle for determining spatial information regarding a second vehicle, the method further comprising adjusting a velocity of the first vehicle in response to the spatial information regarding the second vehicle.

6. The method of claim 1, wherein the at least one initial frame also includes spatial information regarding said vehicle associated with a radar signal reflected directly back from the vehicle.

7. The method of claim 1, wherein the vehicle comprises a car, van or truck.

8. A processor configured to determine spatial information regarding a vehicle by:

receiving at least one initial frame of frequency modulated continuous wave (FMCW) radar data, wherein the at least one initial frame includes spatial information regarding said vehicle associated with a radar signal reflected back from said vehicle via a surface of at least one stationary object other than said vehicle;

receiving at least one further frame of frequency modulated continuous wave (FMCW) radar data, wherein the at least one further frame includes:

spatial information regarding said vehicle associated with a radar signal reflected back from said vehicle via the surface of at least one stationary object other than said vehicle, and spatial information regarding said vehicle associated with a radar signal reflected directly back from the vehicle; and using the at least one initial frame of radar data to correct for static clutter associated with the at least one stationary object in the at least one further frame of radar data.

9. The processor of claim 8, wherein said correcting for static clutter comprises rejecting radar signal components associated with the radar signal reflected back from said vehicle via said surface of at least one stationary object other than said vehicle.

10. The processor of claim 9, wherein said rejecting radar signal components associated with the radar signal reflected back from said vehicle via said surface of at least one stationary object other than said vehicle comprises determining an angle of arrival of said radar signal components.

11. The processor of claim 8, wherein the at least one initial frame also includes spatial information regarding said vehicle associated with a radar signal reflected directly back from the vehicle.

12. An adaptive cruise control system comprising a processor according to claim 8.

13. An electronic control unit (ECU) for a vehicle, the electronic control unit comprising a processor according to claim 8.

14. A vehicle comprising a processor according to claim 8.

* * * * *